Figure 1:
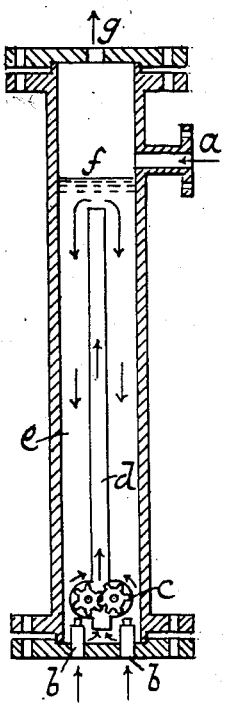

Jan. 31, 1933.   M. PIER ET AL   1,895,769
PRODUCTION OF VALUABLE HYDROCARBONS FROM CARBONACEOUS
MATERIALS WHICH ARE IN THE LIQUID STATE
Filed Nov. 6, 1928

Mathias Pier
Eugen Anthes
Karl Winkler
INVENTORS

BY
ATTORNEYS

Patented Jan. 31, 1933

1,895,769

UNITED STATES PATENT OFFICE

MATHIAS PIER, OF HEIDELBERG, AND EUGEN ANTHES AND KARL WINKLER, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

PRODUCTION OF VALUABLE HYDROCARBONS FROM CARBONACEOUS MATERIALS WHICH ARE IN THE LIQUID STATE

Application filed November 6, 1928, Serial No. 317,575, and in Germany November 10, 1927.

This invention relates to improvements in the production of valuable hydrocarbons from carbonaceous materials which are in the liquid state, such as coal suspensions or pastes thereof, tars, mineral oils and the like.

In the production of valuable liquid hydrocarbons from various sorts of coal, tars, mineral oils and the like, by treatment in a liquid or suspended or pasty condition with hydrogen or gases supplying the same, at elevated temperatures and under pressure, the degree of the conversion is often very injuriously affected because the heavy, asphaltic products, and also the catalysts, when such are employed, for example in the form of suspensions, sink to the bottom of the reaction vessel, or accumulate at some place or other, and thus are wasted so far as the further course of the reaction is concerned. Such local thickening also readily leads to the formation of coke, or to other inconveniences, and has therefore to be removed in a troublesome manner as for example by valves for removing sludge, siphons and the like. Rotary discs, which dip into the liquid under treatment, have also been employed, but the resulting mixing effect is altogether inadequate, for, although movements are set up in certain layers of the liquid, considerable portions of the thickened product are left untouched. Moreover, the usual stirring devices which are known do not effect rapid and intimate mixing of the freshly admitted material with the spent portion, the result being that, in part of the reaction material, an accumulation of heavy constituents, tending to form asphaltum and coke occurs.

We have now found that the operation hereinbefore referred to may be carried out with advantage by imparting to the material under treatment such an intensive state of movement in all those parts of the apparatus, where it is subjected to heat treatment, that no injurious local thickening occurs, and ensuring a good distribution of the hydrogenating gas in the product under treatment, the participants in the reaction being preferably admitted and removed in a continuous manner.

A particular advantage of this manner of working consists in the fact that the troublesome removal of the viscous constituents is dispensed with, since they are continuously and completely remixed with lighter portions and are again passed through the reaction zone. This manner of working also increases the efficient contact between the high boiling products and the hydrogenating gas. Moreover, the process herein described is excellently adapted to the employment of catalysts when operating in the liquid phase, since they are constantly brought into intimate contact with the materials under treatment and cannot adhere, in conjunction with thickened products, to the bottom and sides of the reaction vessel.

The process in accordance with the present invention is carried out with advantage in vertical furnaces, under an elevated pressure, preferably above 30 atmospheres. Pressures, for example of 50, 100, 200 or even 1000 atmospheres come into question depending on the degree of destructive hydrogenation desired, higher pressures leading to a more intensive treatment.

The aforesaid state of motion of the liquid materials under treatment may, for example, be set up by introducing the hydrogenating gas through numerous small apertures, for example through perforated or sieve plates, which, if desired, are arranged in several layers one above the other and/or through one or several nozzles, which preferably have the form of ejectors, under a pressure considerably in excess of that prevailing in the reaction vessel, in such a manner that a continuous drawing up and a whirling motion of vortex character is set up in the liquid materials, accompanied by a very thorough intermixing of the said materials with gas bubbles of smallest dimensions. In place of or besides a high excess of pressure, a mechanical stirrer may be employed, which, if desired, may also be provided with apertures or nozzles for the introduction of hydrogenating gas.

The movement of the liquid products, with the object of preventing injurious local thickening may also be suitably effected by circulating the liquid reaction materials in a hot state. This may be brought about by special mechanical appliances inside the reaction furnace, or also by conducting the liquid material out of the furnace and back into it again. In the latter case care must be taken to prevent any cooling which might result in local deposition of thickened portions. The circulation may be produced by pumps of the most varied types such as reciprocating pumps, valveless pumps, for example geared pumps, centrifugal pumps and the like. This method of working enables the rate of flow to be greatly increased. Several liquid circulations may also be produced simultaneously. Under certain circumstances it is also of advantage to maintain a hot gas circulation, the reaction products formed being separated off either periodically or continuously. All those catalysts suitable for the art of destructive hydrogenation may be employed, in particular those immune to poisoning by sulfur. As examples of catalysts suitable for the purposes of the present invention may be mentioned catalysts comprising compounds containing sulfur in combination, for example metallic sulfids, in particular the heavy metal sulfids and more especially those of the iron group, either alone or as mixtures with one another or with metals, metalloids, active charcoal, coke or the like or with oxids, hydroxids, or carbonates or with other materials of a catalytic or of inert nature. The sulfur may also be combined with the catalyst by adding sulfites or sulfates thereto or by the addition of sulfur to metals or oxids. A very suitable catalyst may be obtained by treating iron with hydrogen sulfid at an elevated temperature. Particularly suitable catalysts of this class are for example cobalt sulfid, iron sulfid, zinc sulfid, nickel sulfid, manganese sulfid and the like or mixtures thereof, for example, mixtures of cobalt sulfid with nickel sulfid or of cobalt sulfid with manganese sulfid, or of cobalt sulfid mixed with iron sulfid, or with zinc sulfid or with aluminium oxid, with or without an addition of inert substances. Catalysts consisting of or containing a metal of the sixth group of the periodic system, such as molybdenum, chromium, tungsten or uranium or the compounds therof or mixtures of these substances are also particularly suitable. As examples of this type of catalysts may be mentioned molybdic acid or ammonium molybdate, tungsten sulfid, tungstic acid, chromium hydroxid and chromic acid. Mixtures of chromium or tungsten with other catalysts such as with cobalt, nickel or iron may also be employed. Activation of the catalysts or the addition of substances increasing their mechanical strength may also be of advantage, this being effected for example with substances having a basic action, such as potassium carbonate, aluminium hydroxid or calcium carbonate. Carriers such as lumps of aluminium silicate may also be employed with advantage. As further catalysts may be mentioned oxidic catalysts comprising zinc oxid, chromium oxid or manganese oxid or mixtures of these, if desired, with an addition of a compound containing fixed nitrogen such as ammonium sulfid or such nitrids as are comparatively stable against the action of water, for example silicon nitrid or titanium nitrid. These said oxidic catalysts may be employed in conjunction with other substances, such as lumps of fire-clay, quartz, asbestos, pumice, coke, active charcoal, metals, in particular heavy metals, metalloids, oxids, sulfids, carbids, and the like and mixtures thereof with the said substances. As still further examples of suitable catalysts may be mentioned such containing at least one of the elements silver, copper, cadmium, lead, bismuth, tin in the form of its compounds, further the difficultly reducible metal oxids or carbonates, such as magnesia, lithium carbonate, boric acid, alumina, the rare earths, including the difficultly reducible oxids of metals from the 4th group of the periodic system, or the oxids of zinc, manganese or vanadium. The catalysts may contain several of these substances or also other substances, for example metals from the 8th group of the periodic system, such as iron. As specific examples of these catalysts may be mentioned such obtained by impregnating porous refractory materials with solutions of lead nitrate, or of stannous chlorid, silver nitrate or of copper hydroxid, either alone or in admixture with compounds of iron, cobalt and the like. Further may be mentioned catalysts containing the oxids of silver or of titanium, or lithium carbonate, magnesite, manganous oxid, silver borate or mixtures of copper oxid with cerous oxid or of silver with cobalt oxid and the like, and also porous refractory masses coated with vanadium oxid or thorium oxid or with a mixture of compounds of uranium and zinc or of silver and tungsten. These latter compounds may also be employed as such without application to the said porous materials. As further suitable catalysts may be mentioned catalysts containing active charcoal or the metalloids boron, silicon, phosphorus, arsenic, selenium, tellurium or the compounds thereof or halogens. These metalloids may advantageously be employed together with elements from the 2nd to the 8th group of the periodic system, in particular such selected from the 6th group of the periodic system. The catalysts may for example contain the following acids or their salts, namely phosphoric acid, arsenious acid, silicic acid, boric acid, hydrofluoric acid, hydrochloric acid, selenious acid and the like. As specific examples may be mentioned silcon carbid, alder-wood charcoal which has been glowed at 800° C. and impregnated with phosphoric acid, calcium phosphate, molybdenum phosphate, tungsten phosphate, iron phosphate, aluminium phosphate, arsenious acid together with molybdenum or tungsten, silicids, for example iron silicid containing 15 per cent of silicon, active silica, hydrosilicates, borids such as titanium borid or iron borid, calcium fluorid, molybdenum with 10 per cent of aluminium chlorid, molybdenum with 10 per cent of cadmium chlorid, molybdic acid with sodium selenite. Compounds containing fixed nitrogen may also be employed with advantage in the reaction. Thus ammonia or its salts, for example, ammonium sulfid and in some cases organic compounds of nitrogen may also be advantageous. Such nitrids as are fairly stable against the action of water have been found to give particularly good results. As further examples of suitable catalysts may be mentioned such containing one or more elements from (a) the 4th to the 8th group of the periodic system, in particular such from the 6th group of the periodic system and more particularly molybdenum together with (b)) small amounts of other elements from the 2nd to the 7th group of the periodic system or copper or gold or the compounds thereof. The elements from the 2nd and 3rd groups may however also be employed in large amounts. Thus mixtures containing molecular proportions of molybdic acid with magnesia or with copper or with aluminium hydroxid, or mixtures of tungstic acid with zinc oxid or of vanadium oxid with magnesia furnish good results. Excellent catalysts are further molybdic acid with about 10 per cent of chromium oxid or of vanadium oxid, molybdic acid with about 10 per cent of uranium oxid or of thorium oxid or of manganous oxid, further tungstic acid containing about 10 per cent of chromium oxid or of a mixture of uranium oxid, cobalt and a small amount of chromium oxid. Again another very suitable class of catalysts is formed by the noble metals or lead or tin or compounds thereof on carriers, in particular on magnesia or magnesite or chromium oxid. As examples of this class of catalysts may be mentioned ruthenium, palladium, platinum, gold, lead or tin or magnesia or magnesite or platinum or gold or chromium oxid. Catalysts containing small amounts of silver or of mixtures of copper with zinc or with cadmium in a free state or in chemical combination and preferably also boron or aluminium or silicon or titanium, or vanadium, or tantalum or chromium or molybdenum or tungsten or cobalt in a free or combined state or mixtures of these. Examples of such catalysts are tantalic acid containing 10 per cent of silver, molybdic acid containing 10 per cent of silver or silica containing 10 per cent of a mixture of copper and zinc. Again another class of catalysts consists of refractory metals or alloys on which small amounts of solid oxids of elements having a catalytic action from the 3rd to the 7th group of the periodic system have been deposited. The said metals or their alloys are preferably employed in an etched condition and preferably acidified solutions or salts of the said oxids are employed as the etching agent.

The reaction products are preferably conducted out of the reaction chamber together with the hydrogenating gas in the form of vapor. After the valuable readily condensable hydrocarbons and the like have been condensed, the uncondensed gases and vapors are returned to the reaction chamber. When the operation is thus carried out, any removal of liquid products becomes unnecessary, although liquid products may also be removed, together with the vaporous products from the reaction chamber, for example by means of siphons, or liquid products alone may be withdrawn at suitable places during the process. The liquid products so withdrawn may be further treated for the production of lubricating oils or other products of considerable value, if desired.

The operation may also be carried out by moving the liquid products with mechanical dredging devices, such as dredgers, scrapers, shovels and the like, in such a way, that the whole of the reaction materials are intimately mixed. In this case it is desirable, that the liquid products under treatment should not be allowed to enter the gas space above the surface of the liquid. Consequently the conveyor or mixing device is preferably so arranged, that it is completely submerged in the liquid. By working in this manner the accumulation of thickenings on the bottom or in other parts of the liquid is prevented because the conveyor device quickly raises and intimately mixes the products, for example, from the lower part of the furnace, where the risk of thickening is greatest. Moreover, according to this method of working, no accumulation of any catalysts which may be employed, can occur.

A further advantageous manner of working according to the present invention consists in passing the products under treatment with high linear velocity through the reaction zone. The hot liquid products can be removed from and returned to the process with or without the employment of the aforesaid circulation.

A good distribution of the hydrogenating gas in the liquid is at the same time assured as hereinbefore stated, preferably by the employment of porous masses, through which the hydrogenating gases are distributed into the liquid under treatment, or by admitting the hydrogenating gases through numerous nozzles and the like. The hydrogenating gas may also be admitted through a small number of openings, and the good distribution is assured by stirring with such vigor that an action similar to that obtained by the use of porous plates is produced.

The high boiling products obtained in accordance with the present invention may be converted, if desired, into lower boiling products by further treatment in the form of vapor with employment of catalysts. For this purpose, the catalysts already mentioned may be employed.

The initial materials may consist of varieties of coal, in the state of pastes or suspensions, tars, mineral oils and other bitumina or bituminous substances, also the distillation, extraction and conversion products of the same. In the case of solid initial materials, such as varieties of coal and the like, it is advisable to convert them, in the first place, into liquid products, by low-temperature distillation, extraction or hydrogenation under pressure and then to treat these in accordance with the present invention.

We will further illustrate the invention with reference to the accompanying diagrams.

According to Figure 1, the introduction of the products to be treated, such as brown coal tar, is effected from the top, at $a$, whilst the hydrogenating gas is admitted from below, through nozzles $b$, of which there is preferably a large number. The reaction liquid fills the reaction chamber $e$ up to the level $f$ and is pumped, by a geared pump $c$, up through the upcast pipe $d$, a circulation being thus set up in the direction indicated by the arrows. The rate of this internal circulation is controlled by the pump. The products to be recovered pass off in the form of vapor at $g$ together with hydrogen.

Figure 2:
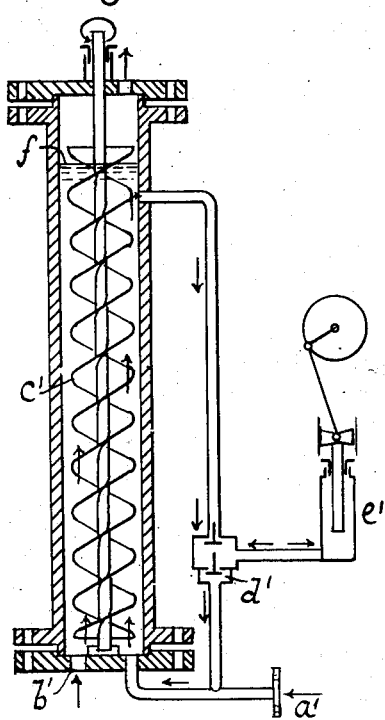

According to Figure 2, the products to be treated are admitted at $a^1$ and the hydrogenating gas through the porous plate $b^1$. The furnace is provided internally with a stirrer $c^1$. The hot liquid material is pumped in the direction of the arrow by a pump $e^1$ operating at ordinary temperature and by means of a valve chamber $d^1$ which is situated outside the reaction chamber and is maintained at the reaction temperature. The hot circulation may also be carried out in the reverse direction.

Figure 3:
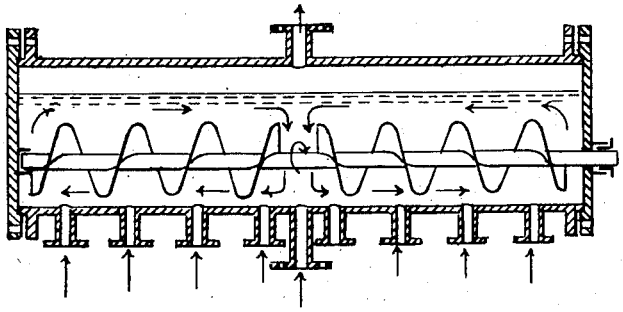

Other means for producing a strong circulation are also possible, such as the employment of two worms (Figure 3) disposed below the surface of the liquid in a horizontal furnace, and causing the material to move in two directions as indicated by the arrows. Pistons with valves may also be used, which are moved rapidly in one direction and thus carry the liquid product into the upper parts of the furnace, by means of upcast pipes and the like.

Figure 4:
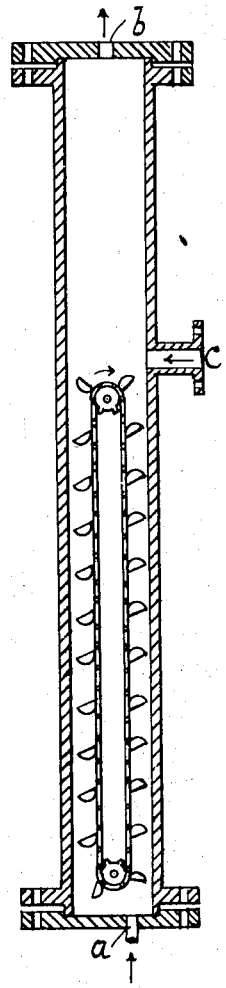

Figure 4 represents a modification provided with a dredger mechanism, the said mechanism being completely submerged in the liquid. The hydrogenating gas is admitted at $a$, and the vaporous reaction products issue at $b$. The inlet for the liquid is at $c$.

What we claim is:—

1. The process of producing valuable liquid hydrocarbons from carbonaceous materials by destructive hydrogenation in the presence of a solid catalyst which comprises effecting the destructive hydrogenation by passing the carbonaceous material in the liquid state and the catalyst into an elongated vertical chamber, forcing hydrogen into said chamber and causing a vigorous circulation of said material and catalyst in well defined streams from one end to the other of said chamber to prevent local thickening of the substances in said chamber.

2. A process as defined in claim 1 wherein the hydrogen is forced into the chamber through a plurality of small openings to cause a thorough mixing of the hydrogen with the substances in said chamber.

3. The process of producing valuable liquid hydrocarbons from carbonaceous materials by destructive hydrogenation in the presence of a solid catalyst which comprises effecting the destructive hydrogenation by passing said material in the liquid state and the catalyst into an elongated vertical chamber, connecting the upper end of said chamber to the lower end thereof exterior of said chamber, forcing hydrogen into said chamber and causing a vigorous, constant, hot circulation of said material and catalyst from the upper end of said chamber through said connection to the lower end of said chamber to prevent local thickening of the substances in said chamber.

4. A process as defined in claim 3 wherein the hydrogen is forced into said chamber through a plurality of small openings to cause a thorough mixing of said hydrogen with the materials in said chamber and aiding said mixing by a mechanical agitation.

In testimony whereof we have hereunto set our hands.

MATHIAS PIER.
EUGEN ANTHES.
KARL WINKLER.